United States Patent [19]

Van Lente et al.

[11] Patent Number: 4,953,305

[45] Date of Patent: Sep. 4, 1990

[54] VEHICLE COMPASS WITH AUTOMATIC CONTINUOUS CALIBRATION

[75] Inventors: Paul S. Van Lente, Holland; Steven L. Geerlings, Zeeland, both of Mich.

[73] Assignee: Prince Corporation, Holland, Mich.

[21] Appl. No.: 54,885

[22] Filed: May 27, 1987

[51] Int. Cl.$^5$ ............................................. G01C 17/30
[52] U.S. Cl. ........................................ 33/356; 33/361; 364/184
[58] Field of Search .................... 33/356, 361, 362; 364/183, 184, 466; 340/661, 662, 663

[56] References Cited

U.S. PATENT DOCUMENTS

| | | | |
|---|---|---|---|
| 3,807,666 | 4/1974 | Devlin | 364/184 |
| 4,555,761 | 11/1985 | Matsumoto et al. | 33/356 |
| 4,622,754 | 11/1986 | Chujo et al. | 33/356 |
| 4,672,565 | 6/1987 | Kuno et al. | 33/356 X |
| 4,685,053 | 8/1987 | Hattori | 364/184 |

Primary Examiner—William D. Martin, Jr.
Attorney, Agent, or Firm—Price, Heneveld, Cooper, DeWitt & Litton

[57] ABSTRACT

A vehicle compass includes a magnetic field sensor for mounting within a vehicle and providing two output channels of information representing orthogonal direction sensing of the earth's magnetic field within the vehicle. The sensor is coupled to an electrical circuit including a microprocessor for sampling the data from each of the two channels and providing a plurality of tests to determine if the rate of change of data is within a prescribed limit thereby indicating valid data is being received. Further, the data is tested to determine the maximum and minimum signal levels during movement of the vehicle through a completed 360° path of travel and for calculating therefrom the compass compensation information used to provide a corrected heading display.

20 Claims, 5 Drawing Sheets

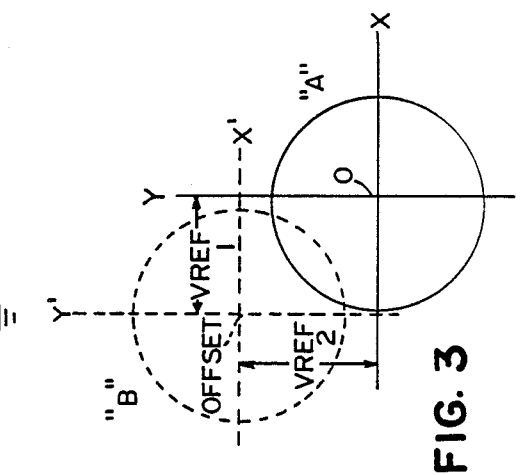
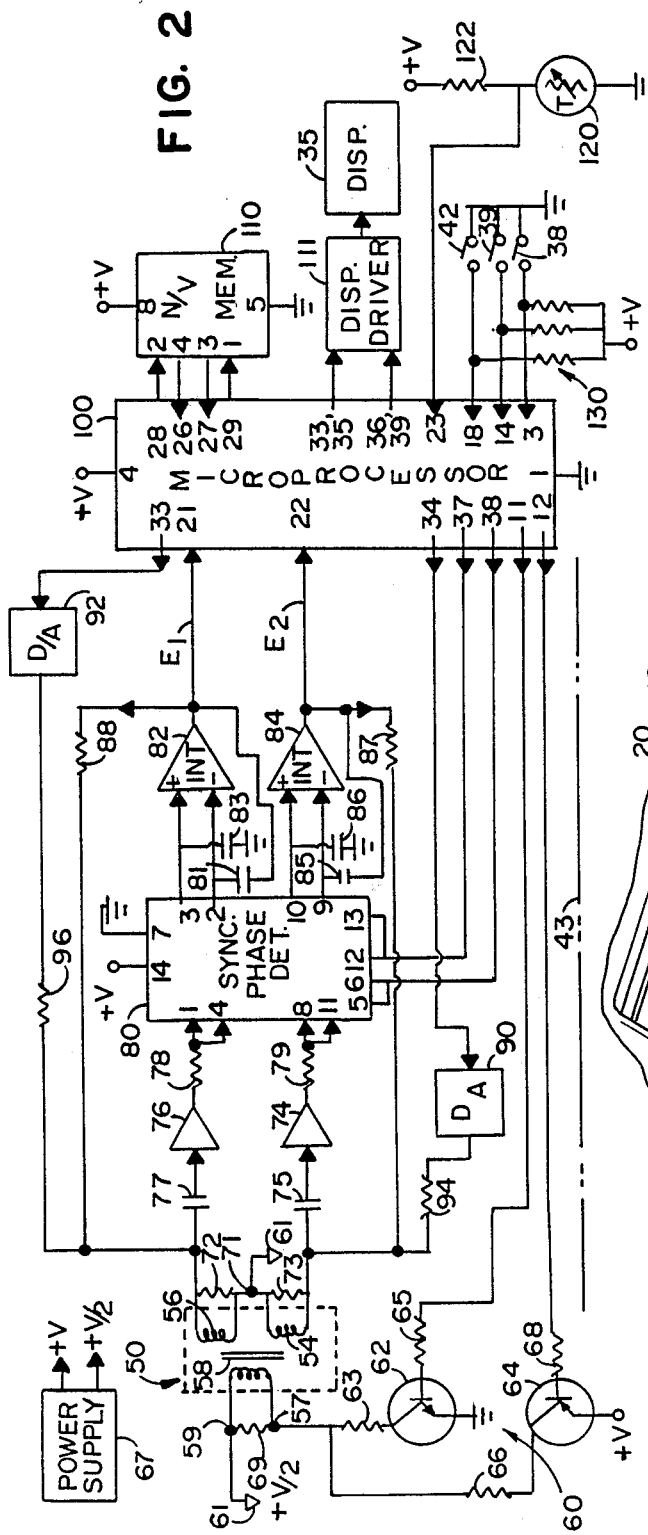
FIG. 2
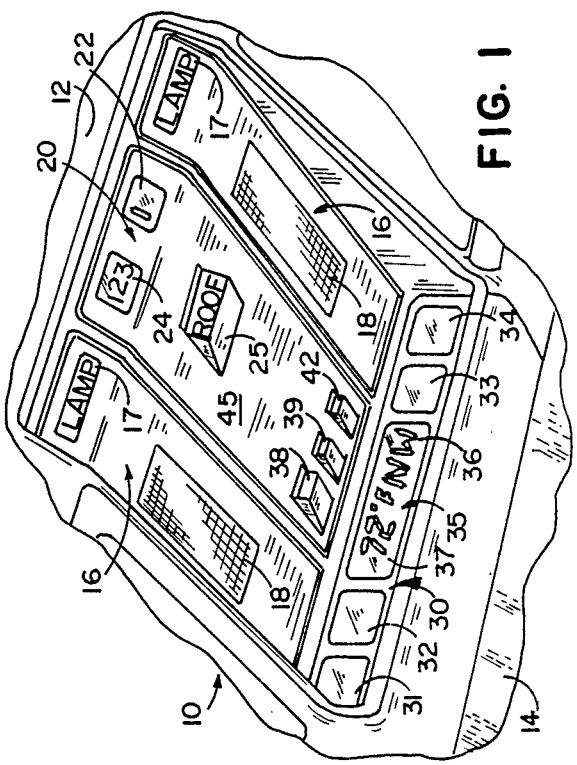
FIG. 3
FIG. 1

VEHICLE COMPASS WITH AUTOMATIC CONTINUOUS CALIBRATION

BACKGROUND OF THE INVENTION

The present invention relates to magnetic direction sensing systems and particularly those for use in vehicles.

U.S. Pat. No. 4,546,551 discloses a flux-gate type sensor and microprocessor controlled compass system which provides both compass compensation and variation correction for a vehicle compass. Although the system works well, it is necessary in some instances to recompensate the compass due to changes in the vehicle's reaction to the earth's magnetic field during the life of the vehicle and during its use. Thus, for example, driving a car through a car wash can flex the sheet metal in the neighborhood of the compass sensor and subsequently change the reaction of the sensor to the earth's magnetic field. With existing compass systems such as the one disclosed in the above identified patent, it is necessary to recompensate the compass at periodic intervals to correct for these variations to provide an accurate heading display over a period of time. It is noted that these problems are somewhat unique to vehicles and particularly to automobiles.

Another problem which is the subject of erratic operation of a vehicle compass is that when the vehicle travels over or near large ferro-magnetic objects such as bridges, metal buildings and the like, the heading display can and frequently will change dramatically due to the interaction of the ferro-magnetic structure with the earth's magnetic field. During such time period, the vehicle compass operation is seriously impaired and can provide erroneous heading information at an inopportune time, for example, when exiting a bridge turning lane.

SUMMARY OF THE PRESENT INVENTION

The system of the present invention provides automatic continuous calibration of the vehicle as it is driven during normal operation without the need for operator inputs or control. Further, the system provides the sampling of direction data on a continuous basis and in the event data changes at a rate faster than the normal turning rate of the vehicle, previous displayed information is displayed until such time as magnetic aberrations disappear. As a result, the system of the present invention provides a vastly improved digital compass for use in a vehicle which is easier to use and provides more accurate heading information over differing conditions of operation.

Apparatus embodying the present invention include a magnetic field sensor for mounting within a vehicle and providing signal information representing sensing of the earth's magnetic field within the vehicle. The sensor is coupled to an electrical circuit for sampling the data from the sensor and providing a plurality of tests to determine if the rate of change of data is within a prescribed limit thereby indicating valid data is being received. Further, the circuit means includes means for testing the data to determine the maximum and minimum signal levels during movement of the vehicle through a completed 360° path of travel and for calculating therefrom the compass compensation information. The circuit in the preferred embodiment of the invention includes a microprocessor and the data is averaged over several such circuits of travel of the vehicle to provide continuously updated and yet averaged compensation correction information. These and other features, objects and advantages of the present invention will become apparent upon reading the following description thereof together with reference to the accompanying drawings in which:

BRIEF DESCRIPTION OF THE DRAWINGS

FIG. 1 is a fragmentary perspective view of a compass installation in a vehicle overhead;

FIG. 2 is an electrical circuit diagram partly in block and schematic form of the compass system embodying the present invention;

FIG. 3 is a graph illustrating the compass compensation and the ideal signal desired from the magnetic field sensor;

DETAILED DESCRIPTION OF THE PREFERRED EMBODIMENT

Figure 4:
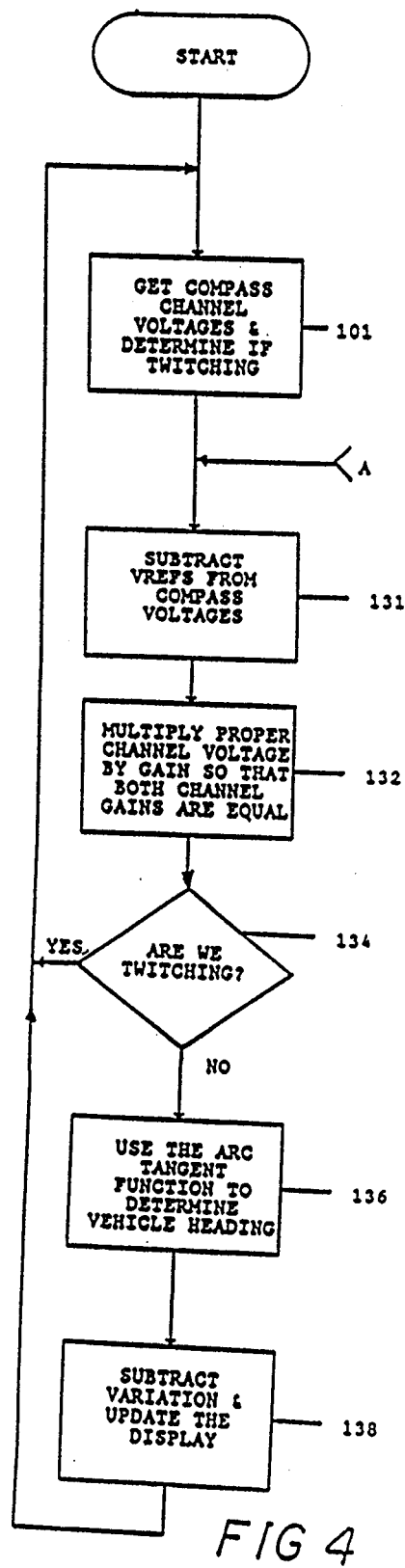
FIG. 4 is a flow diagram illustrating the program operation for the microprocessor shown in FIG. 2 for the main program.
Figure 5A:
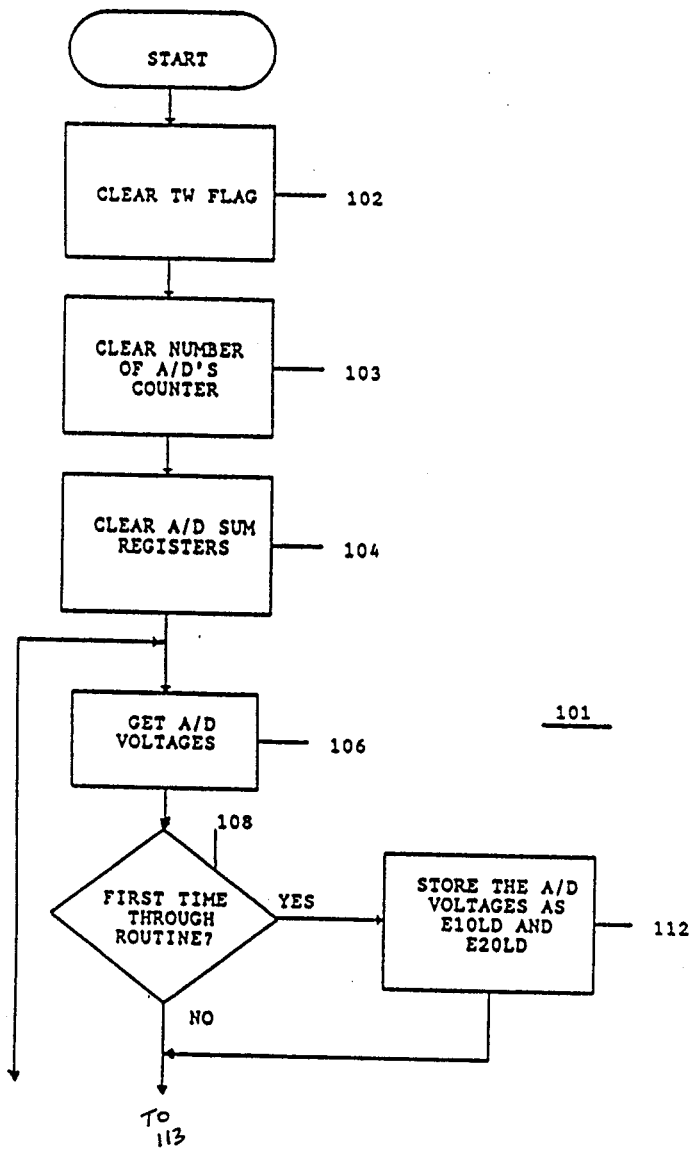
FIG. 5 is a flow diagram of a program subroutine for testing for invalid data.
Figure 5B:
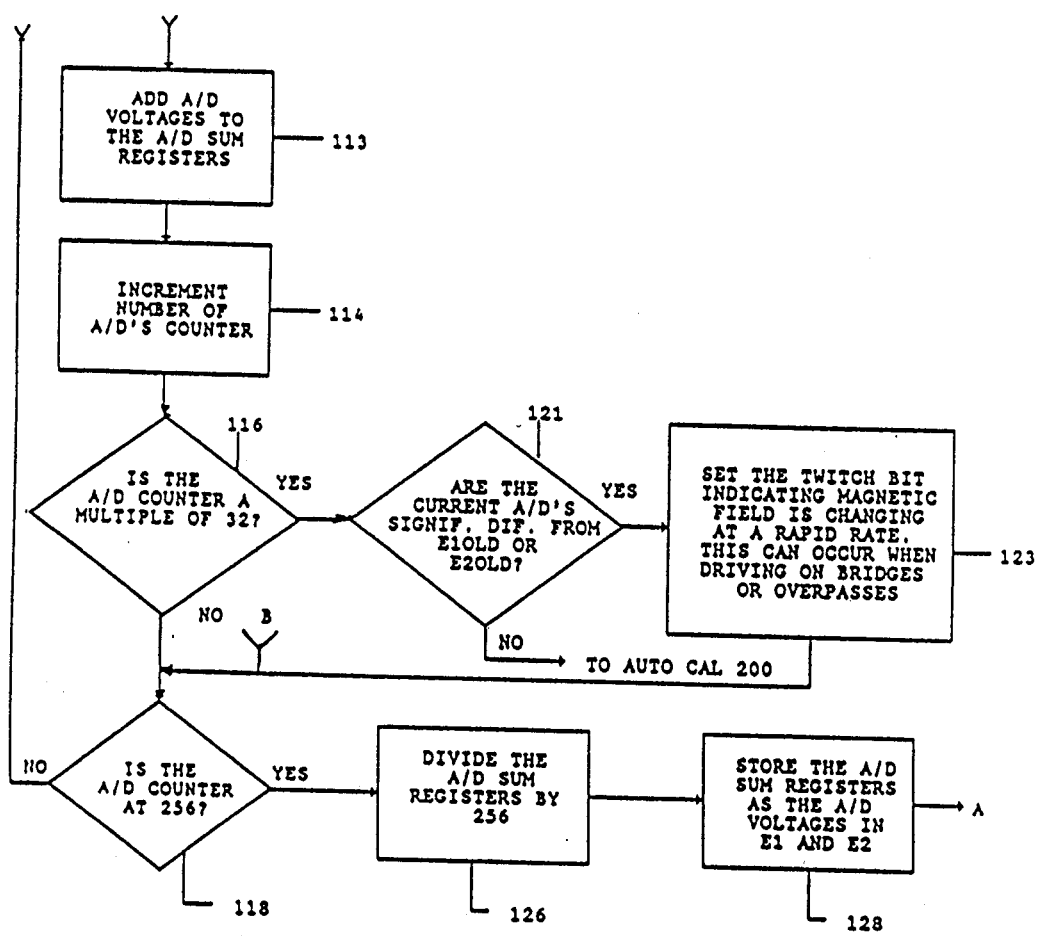

In FIG. 1 there is shown a control and display module 10 which is adapted to be integrally included in a vehicle during manufacturing although it could be separately added at a later time. The module is mounted to the roof 12 of a vehicle and centered near the top edge of windshield 14 typically above the rearview mirror. Module 10 includes a pair of map reading lamps 16 having switches 17 for operating lamp means positioned behind flanges 18 which in turn direct illumination into the lap of either the driver or passenger side of the vehicle depending on which switch is actuated. The center of the module includes a garage door-open transmitter 20 including a three position switch 22 for actuating any one of three different garage door remote control units by the actuation of push button switch 24. Module 10 may also include an electrical sunroof control switch 25 or other vehicle accessory controls. The construction of the lamp module 16 and garage door transmitter module 20 is generally disclosed in U.S. Pat. No. 4,241,870 issued Dec. 20, 1980 and assigned to the present Assignee.

Module 10 also includes a separate display panel 30 which includes display indicators 31–34 for displaying vehicle operating parameters such as engine coolant temperature, oil pressure, generator, and fuel warnings or the like which can either be displayed in a digital alphanumeric format or as warning lights. The center of display module 30 includes a digital display 35 providing, in one embodiment of the invention, an octant display 36 of the vehicle heading in alpha format, and on the left side of display 35 a temperature display 37 for providing Fahrenheit/Centigrade display of the exterior ambient temperature of the air near the vehicle as well as a warning signal when road conditions approach freezing. Module 10 also includes compass and display control switches 38, 39 & 42 which function as described below.

The compass system includes a magnetic sensor 50 such as a flux-gate sensor shown schematically in FIG. 2 and preferably is mounted to a circuit board 43 (shown schematically in FIG. 2) which also contains the remaining circuit elements of FIG. 2. The electrical circuit is similar to that disclosed in allowed copending U.S. Pat. application, Ser. No. 662,717, filed Oct. 19, 1984 and assigned to the present Assignee. The system of the present invention thus employs the unique flux-gate drive and synchronization system which is microprocessor controlled although the programming of the microprocessor is entirely different to achieve the data handling of the present invention. The circuitry of FIG. 2 is disclosed in detail in the above identified copending patent application, the disclosure of which is incorporated herein by reference, however, a brief description of the circuit and the differences follows.

Sensor 50 is a flux-gate sensor which includes an annular core 58 around which there is wound a primary winding 52, a secondary east/west sensing winding 54 and a north/south sensing winding 56. Driving the sensor 50 is an electrical drive circuit 60 for supplying drive signals to the primary 52 of sensor 50 and which includes a pair of solid-state switches 62 and 64 coupled in a push/pull configuration. Switches 62 and 64 in the preferred embodiment of the invention comprise transistors with the emitter of PNP transistor 64 being coupled to the +V supply which in the preferred embodiment of the invention was a 5 volt regulated DC supply provided by power supply 67. The collector of transistor 64 is coupled to the current limiting resistor 66 which in turn is coupled to input terminal 57 of the primary winding 52. The base of transistor 64 is coupled to the microprocessor 100 by means of resistor 68. Similarly, NPN transistor 62 has its emitter coupled to system ground or 0 volts while its collector is coupled to terminal 57 through current limiting resistor 63. The base terminal of transistor 62 is coupled to the microprocessor 100 by means of resistor 65. The remaining terminal 59 of primary winding 52 of sensor 50 is coupled to a floating ground 61 which is +V/2 or 2.5 volts DC. Coupled in parallel with primary 52 and the emitter-to-collector current paths of transistors 62 and 64 is a current controlling resistor 69 for providing midpoint saturation of the flux-gate sensor core 58.

The drive signal applied to circuit 60 is a 1.5 KHz squarewave signal output from terminals 11 and 12, respectively of the microprocessor for driving switches 62 and 64. The microprocessor 100 also provides a 3 KHz output signal at pins 37 and 38 which are related in phase to the drive signal at terminals 11 and 12 to ensure the synchronous phase detector 80 processes the signals from the flux-gate sensor as required.

The secondary windings 54 and 56 of the flux-gate sensor 50 are commonly coupled at terminal 71 which is coupled to the system floating ground 61 as shown. Coupled across each of the secondary windings 54 and 56 is a damping resistor 73 and 72, respectively to prevent oscillation of the output signals. Windings 54 and 56 are capacitively coupled to amplifiers 74 and 76 by means of coupling capacitors 75 and 77, respectively.

The output terminals of amplifiers 74 and 76 are coupled through resistors 79 and 78, respectively to the inputs of an integrated circuit comprising a synchronous phase detector 80. The output terminals of circuit 80 are coupled to integrator circuits 82 and 84 through suitable integrating capacitors 81 and 83 associated with integrator 82 and capacitors 85 and 86 associated with integrator 84. These integrators receive alternate half-cycle sinusoidal signals from the synchronous phase detector 80 to provide a time varying DC level signal at the output terminals representative of the direction sensed by windings 54 and 56 as described in greater detail in U.S. Pat. No. 4,456,551, assigned to the present Assignee and incorporated herein by reference. The direction sensing signals E1 and E2 are fed back to the output terminals of secondary windings 54 and 56 by feedback resistors 87 and 88, respectively. Compass compensation correction information is also supplied to the secondary windings 54 and 56 through resistors 94 and 96 and D/A converters 90 and 92 having their input terminals coupled to output terminals 34 and 33, respectively of microprocessor 100. The compensation correction system which is continuously updated as well as the valid data testing technique is described in greater detail below in connection with the flow diagrams for the microprocessor programming.

The output signals and integrators 82 and 84 are coupled to signal input terminals 21 and 22 o microprocessor 100 which includes internal A/D converters for converting the magnetic field varying DC input information into 8 bit digital signals compatible with the signal format of the microprocessor. Microprocessor 100 is coupled to a nonvolatile memory 110 for in-part, retaining updated compensation and variation correction information. The microprocessor 100 also includes output terminal pin numbers 33, 35, 36 and 39 which are coupled to a display driver 111 for providing signals to the display 35. The display driver 111 and display 35 can be of any type of desired digital display including an alpha/numeric or graphic type display such as the vacuum fluorescent display employed in the preferred embodiment of the invention.

The microprocessor also receives temperature input information from thermistor 120 coupled to the +V supply through a voltage dividing network including serially coupled resistor 122. The analog varying DC voltage from the thermistor is supplied to the microprocessor which includes an internal A/D converter for converting the analog information into a digital format for processing by the microprocessor.

A switching network 130 includes an English/Metric display format switch 38 for converting the temperature display from Fahrenheit to Centigrade as desired, a variation correction switch 39 for providing compass variation correction as described in the above identified copending patent application; and a display on/off switch 42 each coupled to +V through voltage dropping resistors as shown in FIG. 2. Having described the circuit of the compass including its mounting into the headliner or roof of the vehicle, a description of the system operation in conjunction with the programming of microprocessor 100 is now presented in connection with the remaining figures.

The programming of the microprocessor to sample and analyze data from the flux-gate sensor to provide the automatic continuous compensation or calibration function and the valid data testing can best be understood with reference to the flow diagrams of FIGS. 3-7. Referring initially to FIG. 4 there is shown the main program which begins at block 101 which is a subroutine shown in FIG. 5 for determining whether or not valid data is being received. If valid data is not being received the display is not updated to provide the vehicle operator with the best and most recent valid data and the automatic compensation data is not updated. The data testing or twitching subroutine 101 is shown in FIG. 4 and begins by clearing the twitch flag 102 and A/D counters counting the number of data test loops that have been run as indicated by block 103 followed by clearing the A/D sum register block 104 which comprises the summation of data for 256 passes. After the sum registers are cleared as indicated by block 104, the A/D voltages from the flux-gate sensor are received as indicated by block 106 and the system tests as indicated by block 108 whether or not this is the first time through the routine. If it is (upon the first pass through the A/D routine) as indicated by block 112, the A/D voltage for the two channels are stored as E1 old and E2 old since this is the only data presently available. The program then goes to the block 113 where the signal information on this sample cycle is added to the sum registers and subsequently the A/D counter indicating the number of passes is updated as indicated by block 114.

Block 116 tests to determine if it is a 32nd sample or a multiple of 32nd samples inasmuch as the "twitching" or valid data test is conducted every 32nd to determine if it has run through 256 cycles as indicated by block 118 and if not, the loop including blocks 106–116 is then completed until 256 samples are taken. At the first and successive 32nd samples, however, block 116 provides an affirmative response and the program tests at block 121 to determine if the data at the 32nd increment is significantly different from the stored E1 old and E2 old counts at block 112. If the instantaneous voltages E1 and E2 converted to digital numbers after a multiple of 32 samples is different by more than 8 counts from the voltages stored during the previous 32nd reading (8 counts being a number determined by the sensitivity desired and the compass hardware), the data change rate is significantly greater than it should be for normal turning of the vehicle indicating that valid data is not being received due to the erratical external modification of the earth's magnetic field such as when driving near a bridge or other ferro-magnetic structure. This condition is referred to as twitching and if the test indicates the data is significantly different, the twitch bit or flag is set as indicated by block 123.

If the data is valid however, as indicated by a negative test at block 121, the program travels to the automatic calibration or compensation subroutine 200 and after completing the "auto cal" routine 200 (FIGS. 6–8) returns to block 118 at "B" to determine if the 256 sample cycle has been run. Once 256 samples have been run, the data stored in the two channel sum registers indicating the direction information detected by the flux-gate sensor is divided by 256 as indicated by block 126 to provide an average value for direction heading information and the data is stored in the registers E1 and E2 as the A/D voltage as indicated by block 128. The program then returns to the main compass program (FIG. 4) as indicated by arrow A and the reference voltages VREFS (VREF1 and VREF2) are subtracted from the two channel detected voltages indicated by block 131 to correct for the offset shown in FIG. 3. Referring briefly to FIG. 3 there is shown the effect of a static magnetic field interference due to the magnetism of the vehicle. Graph A represents perfect circles centered around a reference point 0 as shown in the FIG. while in reality due to the residual magnetism and the magnetic characteristics of a vehicle which are static but which vary with time and offset represented by a phantom line circle in FIG. 3 exists shifting the voltages detected by the sensor from the 0 reference.

Thus, the voltages detected when heading in any given direction will be either greater or lesser than expected for a vehicle with no magnetic interference. As a result, to each of the channels there must be added or subtracted a reference voltage indicated as VREF1 or VREF2 in FIG. 3 to in effect shift by data manipulation to subtraction or addition of the digital counts corresponding to the reference voltages to determine the signal voltage is actually received to the ideal voltage wave form A as opposed to the actual voltage wave form B. In addition to the static field, causing the offset illustrated in FIG. 3, the earth's field will penetrate the vehicle differently in different directions and thereby the sensor will not react uniformly to the earth's field as a car rotates through 360°. As a result, the circle graph representing the detected sensor voltages for the two channels will, in fact, be elliptical. This requires an additional correction to the curve to convert the ellipse to a circle. This is achieved by scaling the voltage of one of the compass channels with an appropriate GAIN factor so that both compass channels have equal gain as indicated by block 132. The determination of the GAIN factor is discussed below in connection with subroutine 200.

Next, the program looks to see if the twitch bit is set as indicated by block 134 and if it is, the display information is not updated and the program cycles through the routines 101–132. If the twitch bit is not set, the data is valid and it is converted to degree heading information through a standard arc tangent function program as indicated by block 136 after which the information provides a signal used to update the display after correcting for the compass variation error of the geographic area as indicated by block 138. Thus only when valid data is being received is the data corrected for compensation and variation by the main program and the display updated indicating current vehicle heading. In order to provide continuous calibration for the vehicle, the auto cal routine 200 is employed during each 32nd sample as indicated by block 200 in FIG. 4. The auto cal routine 200 is now described in conjunction with FIGS. 6–8.

Figure 6A:
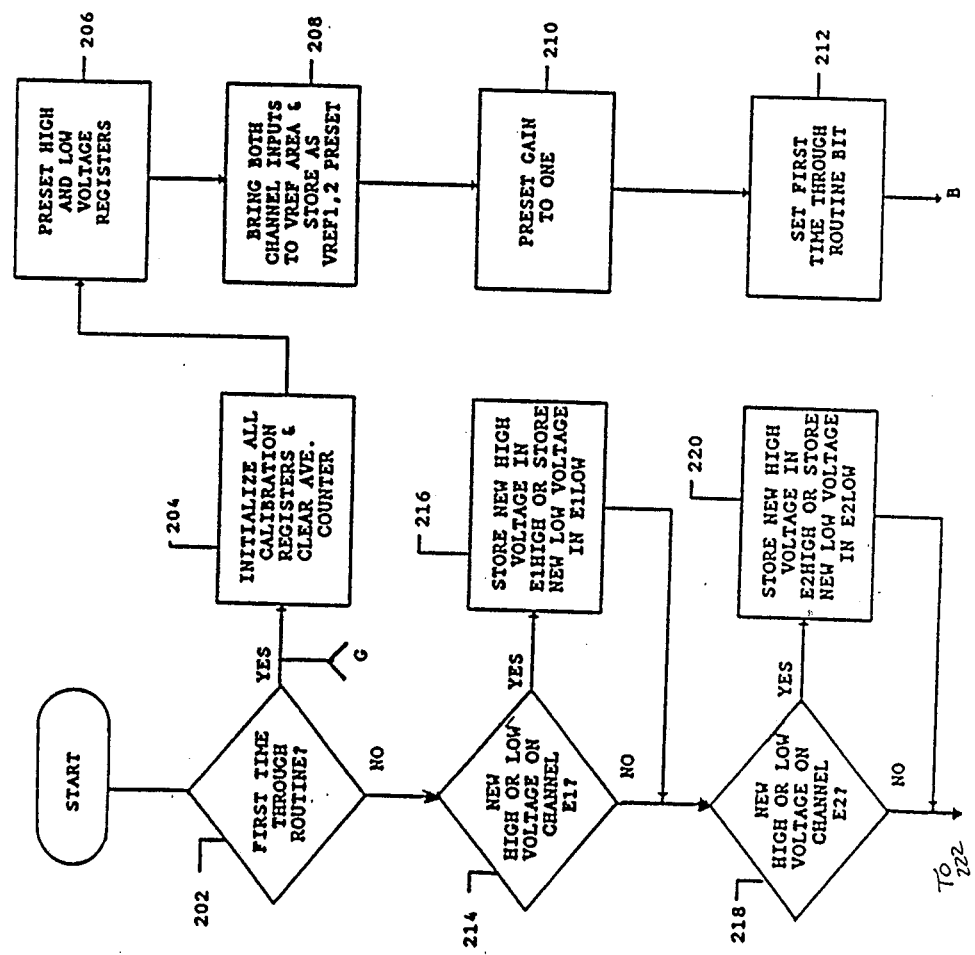
FIGS. 6–8 is a flow diagram for the automatic and continuous compensation program subroutine.
Figure 6B:
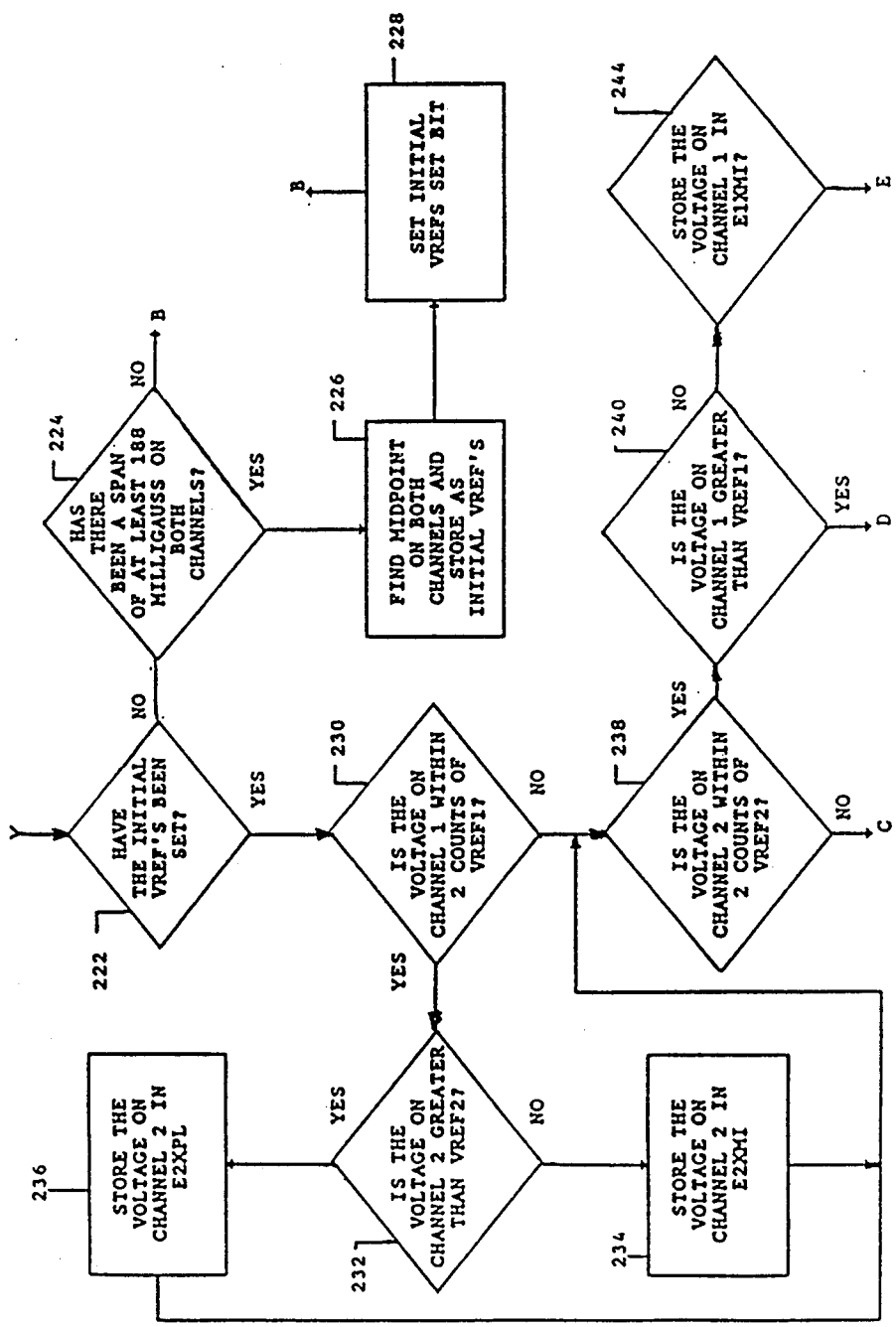
Figure 7A:
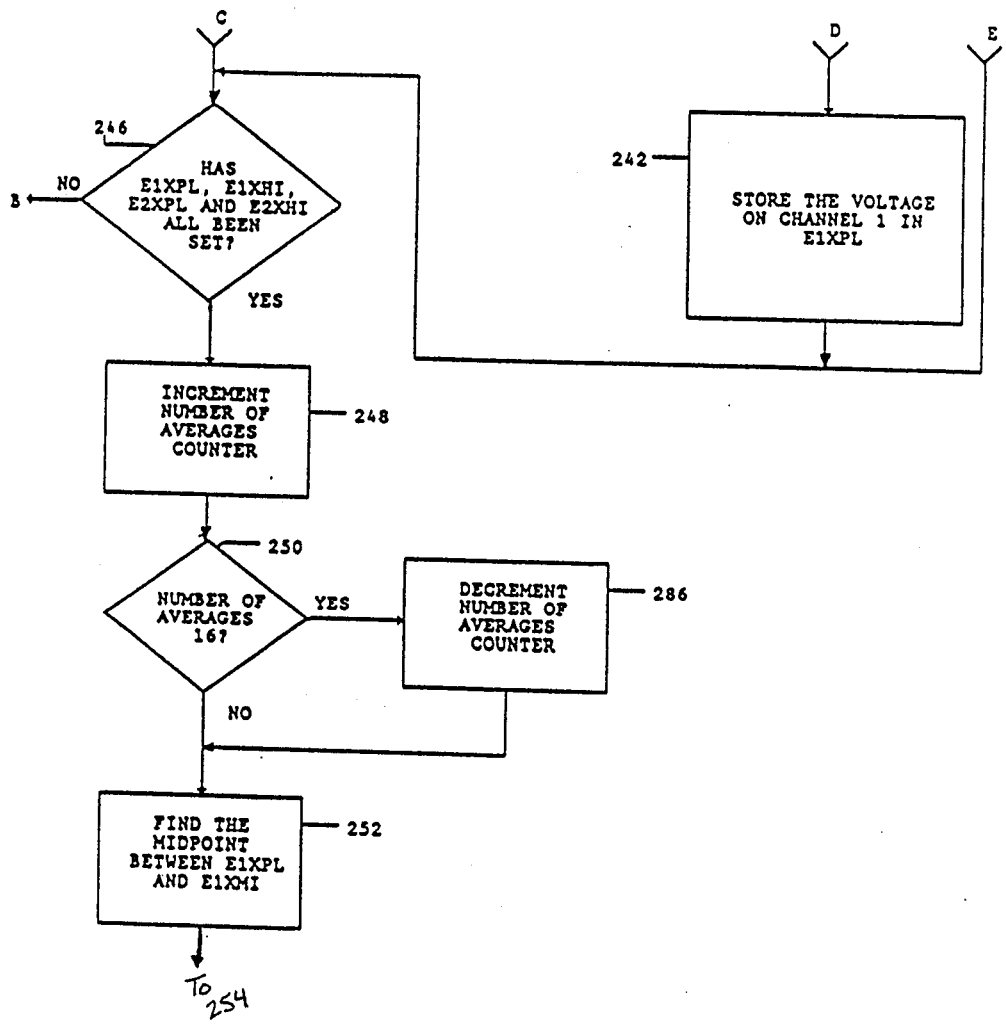
Figure 7B:
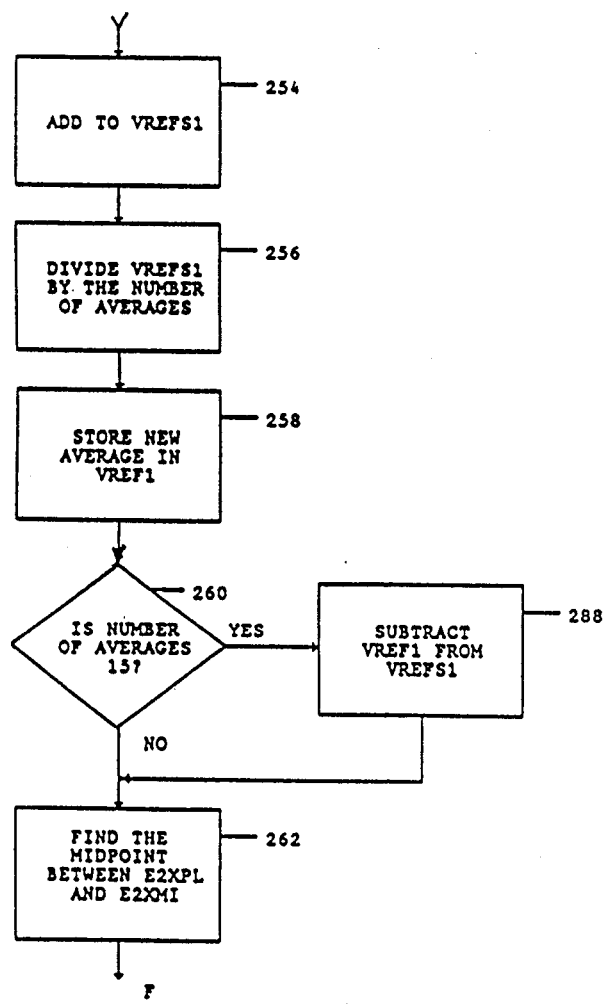
Figure 8A:
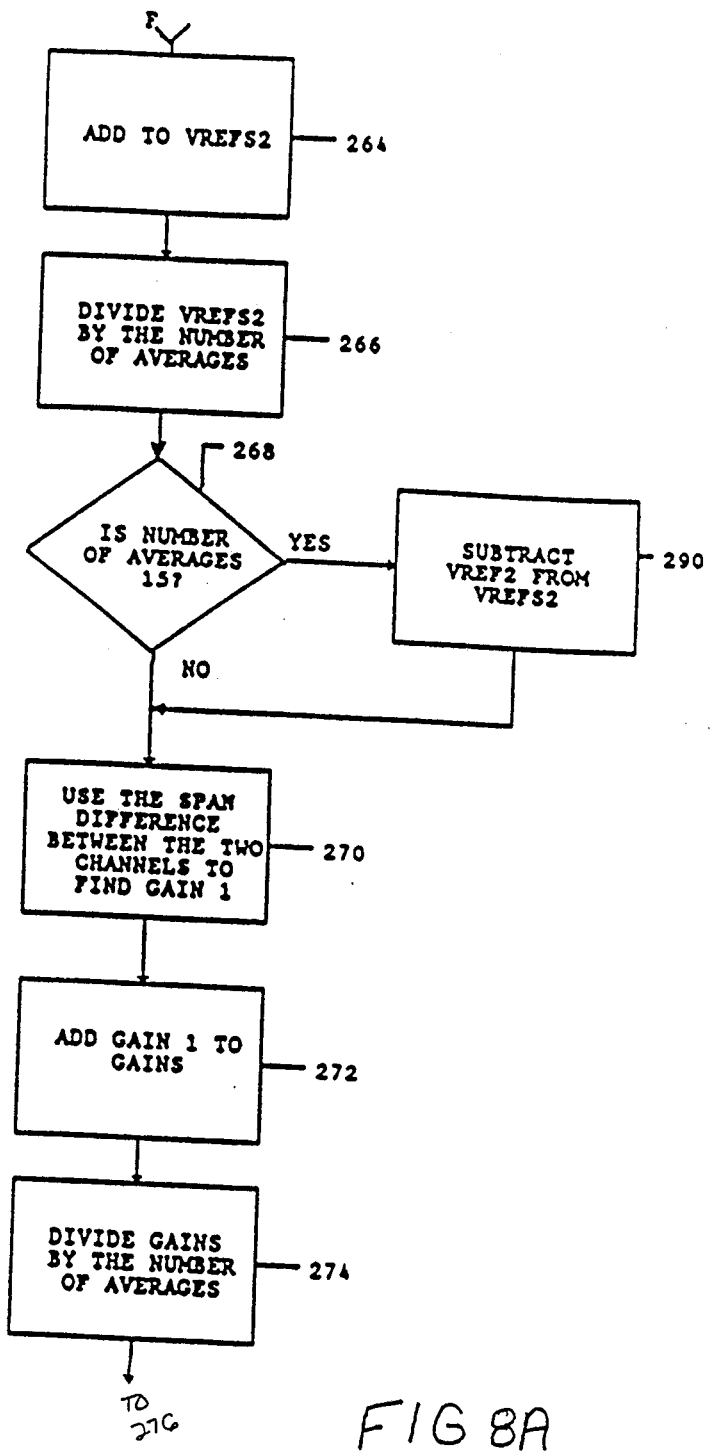
Figure 8B:
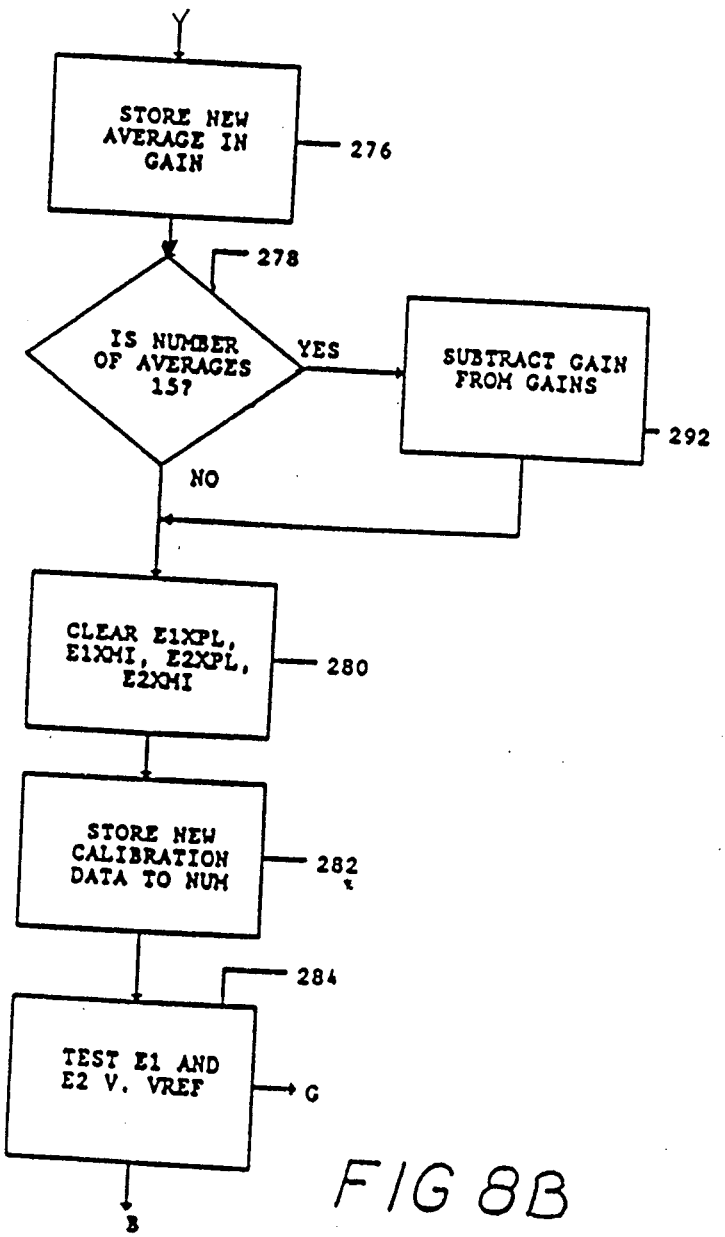

In discussing the flow diagrams of FIGS. 6–8 for the automatic continuous calibration routine, the following symbols and their definitions are used:

VREF1: A number which represents the midpoint of the sensed voltages on channel 1 due to earth's magnetic field. Any changes in the static magnetic field of the vehicle will cause this number to change.

VREF2: A number which represents the midpoint of the sensed voltages on channel 2 due to earth's magnetic field. Any changes in the static magnetic field of the vehicle will cause this number to change.

E1REFS: Contains a number which is the sum of the last 15 (or less just after the initial installation) VREF1 calculations. E2REFS: Contains a number which is the sum of the last 15 (or less just after the initial installation) VREF2 calculations.

GAIN: Contains a number which represents the difference between the total voltage swing on both channels. If channel 1 has a voltage swing of 2 volts and channel 2 has a voltage swing of 2.5 volts, the GAIN would be 1.25.

GAINS: Contains a number which is the sum of the last 15 (or less just after the initial installation) GAIN calculations.

E1XPL: Contains a number which represents the most recent voltage above VREF1 on channel 1 when channel 2 was at VREF2.

E1XMI: Contains a number which represents the most recent voltage below VREF1 on channel 1 when channel 2 was at VREF2.

E2XPL: Contains a number which represents the most recent voltage above VREF2 on channel 2 when channel 1 was at VREF1.

E2XMI: Contains a number which represents the most recent voltage below VREF2 on channel 2 when channel 1 was at VREF1.

E1HIGH: Contains a number which represents the highest voltage sensed on channel 1.

E1LOW: Contains a number which represents the lowest voltage sensed on channel 1.

E2HIGH: Contains a number which represents the highest voltage sensed on channel 2.

E2LOW: Contains a number which represents the lowest voltage sensed on channel 2.

In the automatic calibration subroutine which is run from block 121 (FIG. 5) when there exists no twitching i.e., there exists valid data, test 202 first determines if it is a first time through the routine. If it is upon initial installation of the vehicle's compass, the calibration registers E1XPL, E1XMI, E2XPL, E2XMI and the averages counter described below are cleared. Next, the high and low voltage registers (E1HIGH, E1LOW, E2HIGH and E2LOW) correspondingly to counts representing maximum and minimum sensed voltages for channels 1 and 2 of the sensor input voltage information are preset to their minimum and maximum, respectively as indicated by block 206. As indicated by block 208, each of the sensing channels are set to approximate midpoint which is achieved by applying a signal to the flux-gate sensor to drive the analog voltage therefrom to a midpoint voltage of 2½ volts for the excursion between 0 and 5 volts for each of the two channels. Next, the GAIN factor is initially set at the default value of 1 as indicated by block 210 after which the first time through routine bit flag 212 is set such that the next time through the cycle, the test at block 202 will be negative. The program then returns to block 118 of the routine 100. On a second pass through subroutine 200 the negative test on block 202 goes to test 214 in which the actual data is checked against the preset high and low voltages 206. During the first pass, the voltages will always be higher than the lowest voltage and lower than the highest voltage stored and, as indicated by block 216, the new high and low detected voltages for channel E1 are stored. Next, as indicated by block 218, the test on channel 2 is conducted in the first pass and the initial voltages will be the high and low voltages as indicated by block 220 and are stored as the high and low voltages for this channel. The high and low voltage values (E1HIGH, E1LOW, E2HIGH and E2LOW) for each channel are not allowed (except during the initial calibration process) to change more than 4 A/D voltage counts higher or lower, respectively for each ignition cycle. Every other ignition cycle of longer than 5 minutes in duration will result in the high and low registers being "squeezed" by 4 counts. Squeezing means that the high registers are decremented by 4 counts and the low registers are incremented by 4 counts. These high and low registers can be used to detect gross shifts in vehicle magnetics and also as a rough check of the averaged calibration data.

Next, as indicated by block 222, a test is conducted to determine if the initial VREF voltages have been set. On the initial pass they have not been since they were preset only in block 208 and a test is conducted as indicated by block 224 to determine whether or not the difference between the high and low voltages on both channels is greater than a predetermined detectable magnetic field corresponding to slightly less than twice the minimum horizontal earth's magnetic field. This test will be positive when the vehicle has approximately completed a complete circle corresponding to passing through north, south, east and west, respectively. If the vehicle has completed a circle through whatever circuitous route it may take, a positive test will result and the midpoint between the high and low voltages calculated and initially set in the storage register as initial VREF1 and VREF2 as indicated by blocks 226 and 228 respectively.

The next cycle through the program will result in a positive response to test 222 after which block 230 tests to determine if the voltage on channel 1 or E1 is within 2 counts of VREF1. The voltage E1 corresponds to a sine wave while the plot of E2 corresponds to an orthogonally displaced cosine wave. VREF1 corresponds to the base reference voltage above and below which the E1 excursion takes place to form the sine wave while VREF2 corresponds to the second channel reference voltage above and below which the E2 signal extends. Thus, the test at block 230 tests to determine whether E1 is very close to VREF1 and inasmuch as the voltage E2 at this time would be a maximum or minimum, it provides a timing test at which the E2 can be examined for maximum or minimum level. Thus, if E1 is within two counts of VREF1 as indicated by the test of block 230, the next test is on E2 to determine whether it is greater or less than VREF2 and thereby determining whether it is at the positive or negative maximum of its excursion. If it is not greater than VREF2, then it indicates that E2 is at or near its minimum excursion and below VREF2 and the voltage being read at this time is stored as indicated by block 234 as E2XMI or the minimum voltage of channel 2 detected during the movement of the vehicle around a circle. If the voltage test at 232 is positive, then E2 must be near or at its maximum and the voltage as indicated in block 236 is stored as E2XPL the maximum positive voltage for E2.

After either storage function 234 or 236, the program moves to the test block 238 to do the same type of testing against voltage E1 by looking at the voltage E2 to determine if it is within two counts of VREF2. If it is, it indicates that E1 should be at or near a maximum or minimum point which is tested by block 240 to determine which of the maximum or minimum points are being sensed. If block 240 indicates that E1 is greater than VREF1 then it indicates that positive maximum voltage is being tested and this information is stored as indicated by block 242 as E1XPL. If the voltage is less than VREF1 then it is stored as E1XMI as indicated by block 224. After these tests and storage of digitized minimum and maximum sensed voltages for each channel a test indicated by block 246 is conducted to determine whether the preceding maximum and minimum voltages have been stored. If not, the program proceeds to block 118 and continues looking to determine basically whether the vehicle has been driven in a full circle and continues cycling through this loop until such time as the circle has been completed. If so, the difference between the maximum and minimum values for each channel is calculated and a test is used to determine if the total sensed field strength (E1XPL-E1XMI, E2XPL-E2XMI) is at least two times the minimum horizontal earth's magnetic field. If the test is negative for either or both channels, the channels crossing registers (E1XPL, E1XMI and/or E2XPL, E2XMI) are cleared indicating that new data must be taken and the program proceeds to block 118. These steps are used for additional filtering of unreasonable data.

If these numbers have been set into storage and are valid, the number of averages counter is incremented as indicated by block 248. Inasmuch as it is desired to continually update the calibration information, an average of 15 readings and thus information provided for each complete circle of the vehicle for up to the 15 last circles are employed to provide an average value for VREF1 and VREF2. The counter 248 provides an indication as to when the next incoming data is received and the oldest data is then deleted from the memory and supplanted with the newest information. When a compass is initially installed in a vehicle, naturally the averages will be less than 15 starting with only one. The number of averages received is tested at block 250 to see whether or not at least 15 or 16 sets of data have been stored. If the 16th set of data has not yet been received then the repeat cycle through the program calculates the midpoint between the E1 maximum and minimum as indicated by block 252 to calculate the real reference voltage which was preset at approximately the midpoint as noted at block 226. At block 252 the real VREF1 is added as indicated by block 254 to whatever preexisting VREF1 was stored. At block 256 the average value of the existing data is taken by dividing the total counts by the number of cycles indicated in the counter 250 and the new average VREF1 is stored as indicated by block 258.

Next, as indicated by block 260 a test to determine whether or not 15 averages have been received is conducted and for the initial few cycles this naturally is a negative response and the next test as indicated by block 262 is to determine the maximum and minimums of channel 2 to determine, by a similar process indicated by blocks 264 and 266, an average for VREF2. Again, the number of averages counted is determined by block 268 and the GAIN is then calculated as indicated by block 270.

Initially, as indicated by block 210, the GAIN was arbitrarily set at a default value of 1 indicating that a perfect circle would be initially expected to be detected. In reality one axis of the vehicle may conduct magnetism better than the other axis. As a result, the GAIN indicated by the difference between the total voltage swing, or span, for both channels will typically not be unitary and the program calculates a multiplication factor in which to multiply the lower voltage excursion channel voltage to cause it to equal the voltage excursion of the maximum channel. Thus, for example if the voltage excursion of the north/south channel were 0.8 volts and the voltage excursion of the east/west channel was 1 volt, block 267 would calculate a multiplication factor of 1.25 to multiply incoming information from the north/south channel such that it would be scaled to equal that of data from the east/west channel. This GAIN or scaling factor is stored as indicated by block 272 and averaged as indicated by block 274 and 276 to provide an average GAIN factor for up to the last 15 cycles of data sampling. Again, the number of cycles is tested at block 278 to determine whether there have been 15 received. If there has not been 15 received, the registers previously cleared, as indicated by block 204, are cleared and the system now has one full circle of actual data as opposed to preset data and this data is stored in the nonvolatile memory 110 including VREFS1, VREFS2, GAINS and the number of cycles for up to 15 cycles of such data. Also the E1 high and E1 low and E2 high and E2 low data is stored and tested as indicated by block 284 against the VREFS to determine if VREFS fall within the high and low values for E1 and E2. If VREFS do not fall within the excursion of E1 and E2, this indicates that there has been a gross shift in the vehicle magnetic characteristics which may occur for example, if someone places a magnetic antenna mount on the vehicle roof near the flux-gate sensor or some other relatively major magnetic disturbance occurs. If the test 284 indicates that such a disturbance has taken place, then the automatic continuous calibration routine is reinitialized by going back to block 204 and starting over with the new information. If as is more typical, no catastrophic change has taken place in the vehicle magnetic characteristics, the program returns to block 118.

Thus, it can be seen that with the automatic continuous calibration routine each complete circle made by the vehicle which is detected by the existence of maximum and minimum voltages on E1 and E2 tested by blocks 230-244 provide a set of data which is added to an average to preexisting sets of data up to 15 excursions which could represent a relatively long-term average of vehicle operating data. Depending upon the nature of the vehicle traveled, this calibration data may change as frequently as daily or infrequently as monthly. Naturally, the more frequently the data changes represents the more frequently the vehicle is used. Once 16 sets of data have been received, the test on block 250 is affirmative and the number of averages is counter decremented as indicated by block 286. Also block 260 indicates an affirmative test and the latest averaged value for VREF1 is subtracted from the sum of the VREF1 reference data as indicated by block 288. Similarly the VREF2 averaged data is subtracted as indicated by block 290 as is the GAIN data as indicated by block 292.

Thus, the system retains the 15 most current calculations for the 15 most recent complete excursions of the vehicle through a 360° loop and will therefore correct for any changes in vehicle magnetics. The VREF1 and VREF2 data and the GAIN data are used as indicated by blocks 131 and 132 of the main program (FIG. 4) to provide an accurate heading output signal and have a centered circular characteristic as shown by graph A in FIG. 3. With this system therefore, the compass is continuously providing accurate and updated compensation information and the information sensed by the flux-gate sensor is corrected and displayed to the vehicle operator during the use of the vehicle.

It will become apparent to those skilled in the art that various modifications to the preferred embodiment described and disclosed herein can be made without departing from the spirit or scope of the invention as defined by the appended claims.

The embodiments of the invention in which an exclusive property or privilege is claimed are defined as follows:

1. In an electronic compass system for use in a vehicle such as an automobile comprising:

sensing means for detecting the earth's magnetic field and for providing electrical signals representative of the direction of movement of the vehicle with respect to the earth's magnetic field;

circuit means coupled to said sensing means for providing display output signals representing heading information corresponding to the detected direction;

display means coupled to said circuit means for displaying the vehicle heading in response to said display output signals, wherein the improvement comprises:

said circuit means including means responsive to the direction representative signals for detecting the rate of change of said direction representative signals, and for determining if the rate of change exceeds a predetermined level thereby indicating the existence of invalid detected direction information; and means for providing an error output signal for display in response to said determining means determining that said rate of change exceeds said predetermined level.

2. The system as defined in claim 1 wherein said circuit means includes means responsive to said error output signal for causing said display means to display preexisting heading information, such that said display means will not display invalid direction information in the event invalid direction information is detected until such time as the rate of change decreases below said predetermined level.

3. The system as defined in claim 2 wherein said circuit means includes means for storing the maximum and minimum signals detected during travel of the vehicle in a closed loop and for calculating heading correction information therefrom to correct the heading display to compensate for the magnetic effect of the vehicle on the sensed earth's magnetic field.

4. The system as defined in claim 3 wherein said means for storing including storing a plurality of maximum and minimum signals to determine an ongoing average of said signals.

5. The system as defined in claim 4 wherein said circuit means includes a microprocessor.

6. The system as defined in claim 5 wherein said sensing means includes a flux-gate sensor.

7. An electrical compass system for use in a vehicle such as an automobile comprising:

sensing means for detecting the earth's magnetic field and for providing electrical signals representing the direction of the vehicle in relation to the earth's magnetic field;

circuit means for processing said signals and for providing display output signals in response thereto;

display means coupled to said circuit means and responsive to said display output signals for displaying the vehicle heading; and said circuit means including first determining means responsive to said sensing means for determining that the vehicle has been moved through a closed loop, second determining means responsive to said first determining means and said direction representative signals for determining during the course of movement of the vehicle through a closed loop, the maximum and minimum detected signal level from said sensing means corresponding to the effect of the earth's magnetic field and the magnetic properties of the vehicle on said sensing means; said circuit means further including means for calculating from said maximum and minimum detected signal level an offset signal representing the static flux field due to the vehicle magnetism and means for correcting said display output signals to display the vehicle heading.

8. The system as defined in claim 7 wherein said sensing means includes at least two sensors for sensing the earth's magnetic field in orthogonal directions and wherein said calculating means includes means for determining the difference in signal level of each of the sensors during the course of movement of the vehicle through a closed loop, means for providing from said difference a GAIN correction factor, and means for correcting said display output signals according to said GAIN correction factor to compensate for the asymmetrical interaction between the vehicle and the earth's magnetic field.

9. An electrical compass system for a vehicle, said system including sensing means for sensing a magnetic field and providing output signals representative thereof, circuit means coupled to said sensing means for providing display output signals, and display means coupled to said circuit means and responsive to said display output signals for displaying the sensed magnetic field; wherein the improvement comprises automatic compensation means for continuously correcting the sensed and displayed magnetic field for local magnetic field interference which varies with vehicle use; said compensation means comprising:

said circuit means including means for continuously monitoring signal information from said sensing means first determining means responsive to said output signals for determining that the vehicle has traveled through a closed loop, and second determining means for determining the value of an offset signal during a closed loop of travel of the vehicle said circuit means includes means responsive to said offset signal to provide a compensated heading display, and wherein said circuit means includes means for updating the offset signal value with successive loops of travel of the vehicle.

10. The system as defined in claim 9 wherein said circuit means further includes means for detecting the rate of change of said output signals to determine if the rate of change exceeds a predetermined level thereby indicating the existence of invalid detected direction information and for providing an error output signal for display by another display means in response to said detecting means determining that the rate of change exceeds said predetermined level.

11. The system as defined in claim 10 wherein said circuit means includes means responsive to said error output signal for causing said display means to display preexisting heading information in the event invalid direction information is detected until such time as the rate of change decreases below said predetermined level.

12. The system as defined in claim 11 wherein said circuit means includes means for storing the maximum and minimum signals detected during travel of the vehicle in a closed loop and for calculating heading correction information therefrom to correct the heading display to compensate for the magnetic effect of the vehicle on the sensed earth's magnetic field.

13. The system as defined in claim 12 wherein said means for storing including storing a plurality of maximum and minimum signals to determine an ongoing average of said signals.

14. The system as defined in claim 13 wherein said circuit means includes a microprocessor.

15. The system as defined in claim 14 wherein said sensing means includes a flux-gate sensor.

16. A digital compass system for a vehicle comprising:

a magnetic field sensor;

a microprocessor and interface circuit means coupling said microprocessor to said sensor for providing display output signals representative of the magnetic direction of orientation of said sensor;

display means coupled to said microprocessor for displaying said magnetic direction; and wherein said microprocessor is programmed to provide means for compensating said output signals for local magnetic field interference which otherwise causes said sensor to provide output signals which deviate from the actual magnetic orientation of said sensor with respect to the earth's magnetic field such that the actual magnetic orientation of said sensor will be displayed, said compensating means including means for continuously monitoring signal information from said sensor circuit as the vehicle travels during use, for determining that the vehicle has traveled through a closed loop and, after each completed loop of travel of the vehicle, for determining an updated correction to the sensed field, said compensating means further including means responsive to said updated correction for modifying the signal applied to said display means to correct for the local field interference.

17. An electrical compass system for use in a vehicle such as an automobile comprising:

sensing means for detecting the earth's magnetic field and for providing electrical signals representing the direction of the vehicle in relation to the earth's magnetic field;

circuit means for processing said signals and for providing display output signals during a period of time in which the vehicle travels through a closed loop circumscribing 365° of movement in one direction;

display means coupled to said circuit means and responsive to said display output signals for displaying the vehicle heading;

means for determining that the vehicle has moved through a closed loop, means for determining, during the course of movement of the vehicle through the closed loop, the maximum and minimum detected signal level from said sensing means corresponding to the effect of the earth's magnetic field and the magnetic properties of the vehicle on said sensing means; said circuit means including means for calculating from the signal information during each completed loop of travel of the vehicle, an offset signal representing the static flux field due to the vehicle magnetism and for correcting the display output signals to display the vehicle heading; and said circuit means further including means for detecting the rate of change of said direction representative signals to determine if the rate of change exceeds a predetermined level thereby indicating the existence of invalid detected direction information and for providing an error output signal for display in the event the rate of change exceeds said predetermined level.

18. The system as defined in claim 17 wherein said circuit means provides error output signals for causing the display of preexisting heading information in the event invalid direction information is detected until such time as the rate of change decreases below said predetermined level.

19. The system as defined in claim 18 wherein said circuit means includes a microprocessor.

20. The system as defined in claim 19 wherein said sensing means includes a flux-gate sensor.

* * * * *

UNITED STATES PATENT AND TRADEMARK OFFICE
CERTIFICATE OF CORRECTION

PATENT NO. : 4,953,305

DATED : September 4, 1990

INVENTOR(S) : Paul S. Van Lente et al.

It is certified that error appears in the above-identified patent and that said Letters Patent is hereby corrected as shown below:

Column 4, Line 20:
        "o" should be --of--;

Column 5, Line 23:
        After "32nd" insert --sample.  If it is not a 32nd
        sample, the A/D counter tests--.

Signed and Sealed this

Fifth Day of January, 1993

Attest:

DOUGLAS B. COMER

Attesting Officer   Acting Commissioner of Patents and Trademarks